United States Patent
Wu et al.

(10) Patent No.: US 12,242,975 B2
(45) Date of Patent: Mar. 4, 2025

(54) QUERYING KNOWLEDGE GRAPHS WITH SUB-GRAPH MATCHING NETWORKS

(71) Applicant: International Business Machines Corporation, Armonk, NY (US)

(72) Inventors: Lingfei Wu, Elmsford, NY (US); Chen Wang, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 883 days.

(21) Appl. No.: 17/061,011

(22) Filed: Oct. 1, 2020

(65) Prior Publication Data

US 2022/0108188 A1    Apr. 7, 2022

(51) Int. Cl.
*G06N 5/02*    (2023.01)
*G06F 17/16*   (2006.01)
*G06N 3/045*   (2023.01)
*G06N 5/04*    (2023.01)

(52) U.S. Cl.
CPC ............... *G06N 5/02* (2013.01); *G06F 17/16* (2013.01); *G06N 3/045* (2023.01); *G06N 5/04* (2013.01)

(58) Field of Classification Search
CPC ............ G06N 5/02; G06N 3/045; G06N 5/04; G06N 3/042; G06N 3/044; G06N 3/08; G06N 5/022; G06F 17/16; G06F 17/10; G06F 40/30

See application file for complete search history.

(56) References Cited

U.S. PATENT DOCUMENTS

| | | | |
|---|---|---|---|
| 9,477,759 B2 | 10/2016 | Keysar et al. | |
| 9,998,472 B2 | 6/2018 | VerWeyst et al. | |
| 10,339,190 B2 | 7/2019 | Keysar et al. | |
| 10,606,846 B2 | 3/2020 | Dai et al. | |
| 11,562,239 B2* | 1/2023 | Tarlow | G06N 3/082 |
| 2019/0251480 A1* | 8/2019 | Garcia Duran | G06N 20/20 |
| 2019/0354887 A1* | 11/2019 | Subramanian | G06F 16/9024 |
| 2020/0026770 A1* | 1/2020 | Li | G06F 40/30 |
| 2020/0125958 A1* | 4/2020 | Ishiguro | G06N 5/04 |
| 2020/0242444 A1* | 7/2020 | Zhang | G06F 16/24522 |
| 2020/0293874 A1* | 9/2020 | Ji | G06N 3/08 |

(Continued)

OTHER PUBLICATIONS

Li, Y. et al., "Gated Graph Sequence Neural Networks", https://arxiv.org/abs/1511.05493 (Year: 2017).*

(Continued)

*Primary Examiner* — Alexey Shmatov
*Assistant Examiner* — Devika S Maharaj
(74) *Attorney, Agent, or Firm* — Amin, Turocy & Watson, LLP

(57) ABSTRACT

Techniques regarding identifying candidate knowledge graph subgraphs in a question answering over knowledge graph task are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a question answering over knowledge graph component that encodes graph structure information of a knowledge graph subgraph and a question graph into neural network embeddings.

20 Claims, 13 Drawing Sheets

(56) References Cited

U.S. PATENT DOCUMENTS

| | | | |
|---|---|---|---|
| 2021/0200954 A1* | 7/2021 | Dsouza | G06N 20/00 |
| 2021/0232613 A1* | 7/2021 | Raval Contractor | G06N 5/02 |
| 2021/0295822 A1* | 9/2021 | Tomkins | G06F 16/3323 |
| 2021/0319335 A1* | 10/2021 | Jiang | G06N 5/04 |

OTHER PUBLICATIONS

Zhang, L. et al., "A Bi-directional Message Passing Model for Salient Objection Detection", https://openaccess.thecvf.com/content_cvpr_2018/html/Zhang_A_Bi-Directional_Message_CVPR_2018_paper.html (Year: 2018).*

Zhang, Z. et al., "Cross Message Passing Graph Neural Network", https://ieeexplore.ieee.org/document/9207357, Sep. 28, 2020 (Year: 2020).*

Hamilton, W. et al., "Inductive Representation Learning on Large Graphs", https://arxiv.org/abs/1706.02216 (Year: 2018).*

Sorokin, D. et al., "Modeling Semantics with Gated Graph Neural Networks for Knowledge Base Question Answering", https://arxiv.org/abs/1808.04126 (Year: 2018).*

Vakulenko, S. et al., "Message Passing for Complex Question Answering over Knowledge Graphs", https://dl.acm.org/doi/abs/10.1145/3357384.3358026 (Year: 2019).*

Maheshwari et al. "Learning to Rank Query Graphs for Complex Question Answering over Knowledge Graphs" https://arxiv.org/pdf/1811.01118.pdf, 2018. 17 pages.

Chakraborty et al. "Introduction to Neural Network based Approaches for Question Answering over Knowledge Graphs" JarXiv:1907.09361v1 [cs.CL] Jul. 22, 2019. 34 pages.

Luo et al. "Knowledge Base Question Answering via Encoding of Complex Query Graphs" Proceedings of the 2018 Conference on Empirical Methods in Natural Language Processing, pp. 2185-2194 Brussels, Belgium, Oct. 31-Nov. 4, 2018. 10 pages.

Wu et al. "Introducing External Knowledge to Answer Questions with Implicit Temporal Constraints over Knowledge Base" Future Internet 2020, 12, 45; doi:10.3390/fi12030045, Mar. 2020. 13 pages.

Shirwadkar et al. "Method and System for Processing and Answering" Factual Questions Over Structured Data ip.com, https://ip.com/IPCOM/000258994, Jul. 2, 2019. 6 pages.

Anonymous "A Method to Generate a Dynamic Questionaire Out of the Encoding of a Prescriptive Document" ip.com, :https://ip.com/IPCOM/000257385, Feb. 8, 2019. 9 pages.

Anonymous "Graph Data Summarization in Natural Language" ip.com, :https://ip.com/IPCOM/000253503, Apr. 5, 2018, 4 pages.

Distiawan et al. "GTR-LSTM: A Triple Encoder for Sentence Generation from RDF Data" In Proceedings of the 56th Annual Meeting of the Association for Computational Linguistics. 2018. https://people.eng.unimelb.edu.au/jianzhongq/papers/ACL2018_SentenceGeneration.pdf. 11 pages.

Marcheggiani et al. "Deep Graph Convolutional Encoders for Structured Data to Text Generation" In Proceedings of the 11th International Conference on Natural Language Generation. http://arxiv.org/abs/1810.09995v1. Oct. 23, 2018. 9 pages.

Auer et al. "DBpedia: A Nucleus for a Web of Open Data" The semantic web, pp. 722-735. Springer, 2007. 14 pages.

Bollacker et al. "Freebase: A Collaboratively Created Graph Database For Structuring Human Knowledge" Proceedings of the 2008 ACM SIGMOD International Conference on Management of Data, pp. 1247-1250. AcM. 3 pages.

Bordes et al. "Question Answering with Subgraph Embeddings" arXiv:1406.3676v3 [cs.CL] Sep. 4, 2014. 12 pages.

Cho et al. "Learning Phrase Representations using RNN Encoder-Decoder for Statistical Machine Translation" arXiv:1406.1078v3 [cs.CL] Sep. 3, 2014, 15 pages.

Dong et al. "Coarse-to-Fine Decoding for Neural Semantic Parsing" arXiv:1805.04793v1 [cs.CL] May 12, 2018, 12 pages.

Fey et al. "Fast Graph Representation Learning with PyTorch Geometric" arXiv:1903.02428v3 [cs.LG] Apr. 25, 2019, 9 pages.

Gilmer et al. "Neural Message Passing for Quantum Chemistry" arXiv:1704.01212v2 [cs.LG] Jun. 12, 2017, 14 pages.

Hao et al. "A subgraph-representation-based method for answering complex questions over knowledge bases" Neural Networks, Jul. 2019, 25 pages.

Hochreiter et al. "Long Short-term Memory" Neural Computation 9(8) 1735-80 • Dec. 1997, 33 pages.

Hu et al. "Answering Natural Language Questions by Subgraph Matching over Knowledge Graphs" IEEE Transactions on Knowledge and Data Engineering, 2017, 14 pages.

Hu et al. "A State-transition Framework to Answer Complex Questions over Knowledge Base" Proceedings of the 2018 Conference on Empirical Methods in Natural Language Processing, pp. 2098-2108. 11 pages.

Kim "Convolutional Neural Networks for Sentence Classification" arXiv:1408.5882v2 [cs.CL] Sep. 3, 2014, 6 pages.

Kimgma et al. "Adam: a Method for Stochastic Optimization" arXiv:1412.6980v9 [cs.LG] Jan. 30, 2017, 15 pages.

Kumar et al. "Difficulty-controllable Multi-hop Question Generation From Knowledge Graphs" International Semantic Web Conference, pp. 382-398. Springer, 17 pages.

Li et al. "Gated Graph Sequence Neural Networks" arXiv:1511.05493v4 [cs.LG] Sep. 22, 2017, 20 pages.

Severyn et al. "Learning to Rank Short Text Pairs with Convolutional Deep Neural Networks" Proceedings of the 38th international ACM SIGIR Conference on Research and Development in Information retrieval, pp. 373-382. ACM.10 pages.

Talmor et al "The Web as a Knowledge-base for Answering Complex Questions" arXiv:1803.06643v1 [cs.CL] Mar. 18, 2018, 14 pages.

Tay et al "Learning to Rank )estion Answer Pairs with Holographic Dual LSTM Architecture" arXiv:1707.06372v1 [cs.IR] Jul. 20, 2017, 10 pages.

Yao et al. "Information Extraction over Structured Data: Question Answering with Freebase" In Proceedings of the 52nd Annual Meeting of the Association for Computational Linguistics (vol. 1: Long Papers), pp. 956-966.11 pages.

Yih et al. "Semantic Parsing via Staged Query Graph Generation: Question Answering with Knowledge Base" Proceedings of the 53rd Annual Meeting of the Association for Computational Linguistics and the 7th International Joint Conference on Natural Language Processing (vol. 1: Long Papers), pp. 1321-1331. 12 pages.

Zhou et al. "An Interpretable Reasoning Network for Multi-Relation Question Answering" arXiv:1801.04726v3 [cs.CL] Jun. 1, 2018, 18 pages.

Mell, Peter, et al. "The NIST Definition of Cloud Computing." National Institute of Standards and Technology. Sep. 2011. 7 pages.

* cited by examiner

700

| Dataset | Model | MRR | R@1 | R@5 |
|---|---|---|---|---|
| CWQ | B-B | 73.85 | 58.31 | 94.79 |
| | C-C | 72.96 | 57.72 | 95.19 |
| | B-M | 81.73 | 70.34 | 96.19 |
| | G-M | 84.30 | 74.95 | 96.99 |
| PQ | B-B | 69.70 | 51.82 | 95.95 |
| | C-C | 74.01 | 58.30 | 95.75 |
| | B-M | 85.86 | 77.93 | 96.35 |
| | G-M | 89.77 | 84.21 | 97.16 |

800

| Dataset | Model | Acc | P | R | F1 |
|---------|-------|-------|-------|-------|-------|
| CWQ | B-B | 93.67 | 93.76 | 93.76 | 93.76 |
| | C-C | 94.23 | 93.94 | 94.75 | 94.34 |
| | B-M | 94.35 | 95.31 | 93.46 | 94.38 |
| | G-M | 95.31 | 95.47 | 95.27 | 95.37 |
| PQ | B-B | 95.30 | 92.10 | 99.10 | 95.47 |
| | C-C | 95.00 | 93.02 | 97.30 | 95.11 |
| | B-M | 95.70 | 93.61 | 98.10 | 95.80 |
| | G-M | 95.55 | 95.50 | 95.60 | 95.55 |

FIG. 8

QUERYING KNOWLEDGE GRAPHS WITH SUB-GRAPH MATCHING NETWORKS

BACKGROUND

The subject disclosure relates to querying one or more knowledge graphs ("KG") with one or more sub-graph matching networks, and more specifically, to a graph based matching and ranking model for performing KG question answering that exploits rich structural information comprised in question and KG subgraphs.

Question answering over knowledge graph ("KG-QA") is a machine learning task that aims to leverage the factual information in a large KG to answer a complex natural language question. Efficiently and effectively finding the desired answer from a KG is challenging at least because the KG can include a large volume of nodes with different entity names or types, as well as complex edges with local or global semantic relations. Traditional approaches to execute KG-QA tasks resort to semantic parsing or retrieve-then-extract methods. Semantic parsing methods translate a natural language question to a KG query, which can subsequently be used to query the KG directly in order to derive the answer to the natural language question. Retrieve-then-extract methods first retrieve the KG coarsely to obtain a set of subgraphs containing multiple answer candidates. Subsequently, answers to the natural language question are extracted from the top-K matching subgraphs.

However, it is often inefficient to search all possible subgraphs to find the desired answer. Additionally, the structural complexity of natural language questions can lead to ambiguity in the subgraph search. Further, a semantic gap between the structure of the natural language questions and the structure of the KG can further render traditional KG-QA approaches ineffective.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate one or more KG-QA tasks are described.

According to an embodiment, a system is provided. The system can comprise a memory that can store computer executable components. The system can also comprise a processor, operably coupled to the memory, and that can execute the computer executable components stored in the memory. The computer executable components can comprise a question answering over knowledge graph component that can encode graph structure information of a knowledge graph subgraph and a question graph into neural network embeddings. An advantage of such a system can be that the graph structure information can be incorporated into a search for knowledge graph subgraph candidates for a question answering over knowledge graph task.

In some examples, the system can further comprise a question graph component that can construct the question graph from a natural language question using a semantic parsing algorithm. Also the system can comprise a knowledge graph subgraph component that can construct the knowledge graph subgraph from one or more semantic triples included in a knowledge graph. The question graph and the knowledge graph subgraph can be directed graphs. An advantage of such a system can be that one or more semantic contexts can be captured by the question graph and/or knowledge graph subgraph, which can be further encoded via bidirectional graph neural networks.

According to an embodiment, a computer-implemented method is provided. The computer-implemented method can comprise encoding, by a system operatively coupled to a processor, graph structure information of a knowledge graph subgraph and a question graph into neural network embeddings. An advantage of such a computer-implemented method can be the incorporation of graph structure information in a match-then-rank approach that identifies knowledge graph subgraphs for answering a natural language question.

In some examples, the computer-implemented method can further comprise employing, by the system, a first bidirectional graph neural network to encode the structure information of the question graph into a first neural network embedding from the neural network embeddings. Also, the computer-implemented method can comprise employing, by the system, second bidirectional graph neural network to encode the structure information of the knowledge graph subgraph into a second neural network embedding from the neural network embeddings. An advantage of such a computer-implemented method can be that the structural information of the graphs can be utilized to narrow a semantic gap between a natural learning question and a knowledge graph.

According to an embodiment, a computer program product for identifying candidate knowledge graph subgraphs in a question answering over knowledge graph task is provided. The computer program product can comprise a computer readable storage medium having program instructions embodied therewith. The program instructions can be executable by a processor to cause the processor to encode, by the processor, graph structure information of a knowledge graph subgraph and a question graph into neural network embeddings. An advantage of such a computer program product can be increased accuracy and/or precision in identifying a knowledge graph subgraph for answering a natural language question, as compared to traditional approaches to executing KG-QA tasks.

In some examples, the computer program instructions can further cause the processor to determine, by the processor, an amount of similarity between the question graph and the knowledge graph subgraph based on a first neural network embedding from the neural network embeddings and a second neural network embedding from the neural network embeddings. The program instructions can also cause the processor to match, by the processor, the knowledge graph subgraph to the question graph based on the amount of similarity being greater than or equal to a defined threshold. Moreover, the program instructions can cause the processor to rank, by the processor, the knowledge graph subgraph amongst a plurality of knowledge graph subgraphs based on the amount of similarity. The plurality of knowledge graph subgraphs can be constructed from the knowledge graph. An advantage of such a computer program product can be the enablement of two sub-tasks (e.g., matching and ranking knowledge graph subgraphs) based on similarities that incorporate graph structure information.

BRIEF DESCRIPTION OF THE DRAWINGS

FIG. 8 illustrates a diagram of an example, non-limiting table depicting matching results on multiple test datasets to demonstrate the efficacy of one or more KG-QA tasks in accordance with one or more embodiments described herein.

DETAILED DESCRIPTION

Figure 1:
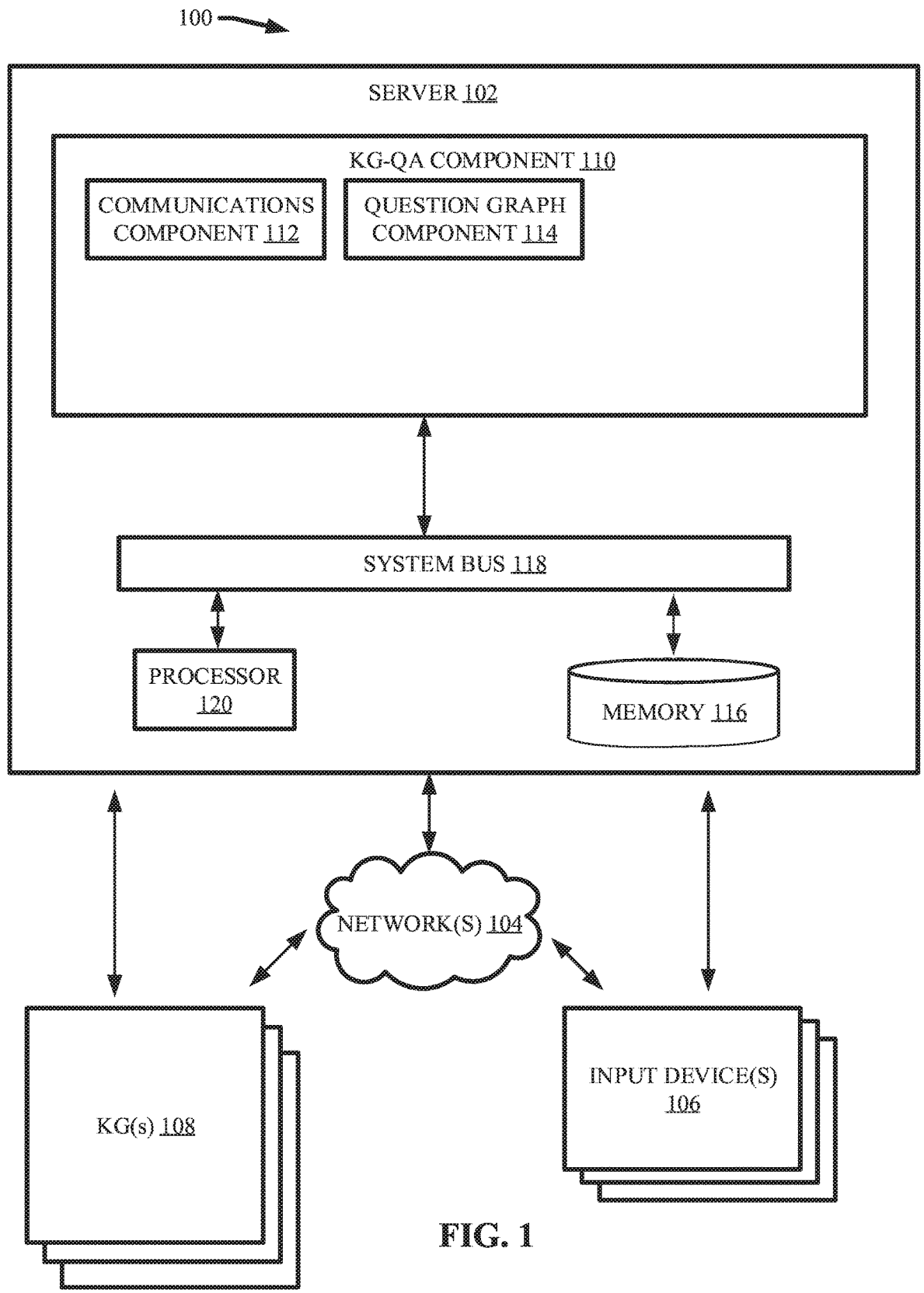
FIG. 1 illustrates a block diagram of an example, non-limiting system that can construct one or more question graphs regarding a natural language question to facilitate execution of a KG-QA task in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of KG-QA; the present disclosure can be implemented to produce a solution to one or more of these problems by employing a graph based learning to rank model that can exploit rich structural information in both natural language questions and KG subgraphs. Advantageously, one or more embodiments described herein can reduce semantic gap between the natural language questions and the KG subgraphs. Additionally, one or more embodiments described herein can advantageously encode graph structure information via bidirectional graph neural networks ("GNNs") to facilitate a search for candidate KG subgraphs to answer a natural language question.

Various embodiments of the present invention can be directed to computer processing systems, computer-implemented methods, apparatus and/or computer program products that facilitate the efficient, effective, and autonomous (e.g., without direct human guidance) employ a match-then-rank approach for executing a KG-QA task. For example, in one or more embodiments described herein can construct one or more question graphs and KG subgraphs based on a natural language question and one or more KGs. Additionally, various embodiments described herein can encode structure information of the one or more question graphs and KG subgraphs via a plurality of bidirectional GNNs. The embeddings generated by the bidirectional GNNs can be utilized to determine matching scores characterizing an amount of similarity between the question graph and the KG subgraphs. Further, the matching scores can be utilized to match and/or rank the KG subgraphs.

The computer processing systems, computer-implemented methods, apparatus and/or computer program products employ hardware and/or software to solve problems that are highly technical in nature (e.g., querying a KG to answer a natural language question), that are not abstract and cannot be performed as a set of mental acts by a human. For example, an individual, or a plurality of individuals, cannot encode question graphs and/or KG subgraphs via bidirectional GNNs. Further, the various embodiments can employ machine learning technologies to search KG subgraphs that can contain vast volumes of data that cannot be readily analyzed by a person with the effectiveness or efficiency described herein.

Also, one or more embodiments described herein can constitute a technical improvement over conventional KG-QA task approaches by exploiting graph structure information of the natural language question and KG subgraphs for improving KG subgraph matching accuracy and ranking performance. Additionally, various embodiments described herein can demonstrate a technical improvement over conventional KG-QA task approaches by employing a graph based approach to overcome semantic differences between the structure of the natural language question and the one or more KGs.

Further, one or more embodiments described herein can have a practical application by casting a querying KG task as a graph based learning to rank task and leveraging neural network embeddings to encode graph structural information regarding semantic complexities. For example, one or more embodiments described herein can control a first bidirectional GNN (e.g., a bidirectional gated graph sequence neural network) for encoding the question graph and a second bidirectional GNN (e.g., a bidirectional message passing neural network) for encoding the KG subgraphs. Thereby, the one or more embodiments, can perform subgraph matching and ranking techniques that incorporate the graph structure information.

As used herein, the term "machine learning task" can refer to an application of artificial intelligence technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as classification, regression, and/or clustering. Execution of a machine learning task can be facilitated by one or more artificial intelligence models trained on one or more datasets in accordance with one or more model configuration settings.

As used herein, the term "neural network" can refer to a computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Neural networks can learn through training, wherein data with known outcomes is inputted into the computer model, outputs regarding the data are compared to the known outcomes, and/or the weights of the computer model are autonomous adjusted based on the comparison to replicate the known outcomes. As used herein, the term "training data" can refer to data and/or data sets used to train one or more neural network models. As a neural network trains (e.g., utilizes more training data), the computer model can become increasingly accurate; thus, trained neural network can accurately analyze data with unknown outcomes, based on lessons learning from training data, to facilitate one or more machine learning tasks. Example neural network can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), and/or neural turing machine ("NTM").

FIG. 1 illustrates a block diagram of an example, non-limiting system 100 that can perform one or more KG-QA tasks. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, etc.) can cause the machines to perform the operations described.

As shown in FIG. 1, the system 100 can comprise one or more servers 102, one or more networks 104, and/or one or more KGs 108. The server 102 can comprise KG-QA component 110. The KG-QA component 110 can further comprise communications component 112 and/or question graph component 114. Also, the server 102 can comprise or otherwise be associated with at least one memory 116. The server 102 can further comprise a system bus 118 that can couple to various components such as, but not limited to, the KG-QA component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or KGs 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the KG-QA component 110 can be provided on the one or more servers 102, it should be appreciated that the architecture of system 100 is not so limited. For example, the KG-QA component 110, or one or more components of KG-QA component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more natural language questions into the system 100, thereby sharing (e.g., via a direct connection and/or via the one or more networks 104) said question data with the server 102. For example, the one or more input devices 106 can send question data to the communications component 112 (e.g., via a direct connection and/or via the one or more networks 104). Additionally, the one or more input devices 106 can comprise one or more displays that can present one or more outputs generated by the system 100. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

The one or more KGs 108 can be one or more collections of data that can be queried by the KG-QA component 110 to identify an answer to one or more natural language questions presented via the one or more input devices 106. The one or more KGs 108 can represent one or more collections of entities (e.g., objects, events, concepts, documents, and/or the like) interlinked via one or more entity descriptions. The entity descriptions can contribute to one another to form one or more networks where each entity can represent a part of the description of the entities and can thereby provide a context for interpreting the other entities. For example, the one or more KGs 108 can provide a context for the collections of data via links between entities in the network of the KG 108 and/or sematic metadata associated with the various entities. In various embodiments, the one or more KGs 108 can exhibit characteristics of a database (e.g., by enabling data to be explored via structure queries), a graph (e.g., by enabling analyzation by one or more network data structures), and a knowledge base (e.g., by bearing formal semantics that can be employed to interpret the data and infer one or more facts and/or lessons). Although FIG. 1 depicts the one or more KGs 108 outside the server 102, the architecture of the system 100 is not so limited. For example, one or more embodiments in which the KG-QA component 110 and the KGs 108 are positioned in the same architectural block of the system 100 (e.g., both positioned in the server 102) are also envisaged.

Given a natural language question "Q" (e.g., provided via the one or more input devices 106) and a set "S" of subgraphs "g" (e.g., characterized by S={$g_1, g_2, \ldots g_n$}) from a KG 108, the KG-QA component 110 can automatically determine whether the natural language question matches a KG subgraph and then rank all the KG subgraphs in the set based on one or more matching relevance scores associated with the KG subgraphs. In various embodiments, the KG-QA component 110 can employ two or more bidirectional GNNs to encode one or more question graphs and/or subgraphs of the KG 108. For example, a neural network embedding of the one or more question graphs "$g_Q$" can be characterized by Equation 1 below, and neural network embeddings of the one or more subgraphs of KG 108 "$g_i$" can be characterized by Equation 2 below.

$$g_Q = (V_Q, E_Q) \quad (1)$$

$$g_i = (V_i, E_i) \quad (2)$$

Where "V" can be a set of nodes included in the graphs and "E" can be a set of edges between the nodes.

In various embodiments, the question graph component 114 can construct one or more of the question graphs based on the given natural language question. For example, the one or more question graphs generated by the question graph component 114 can characterize the natural language question by a directed graph "$g_Q$". In various embodiments, the question graph component 114 can generate the one or more question graphs using one or more semantic parsing algorithms, such as a constituency parsing algorithm. Other example semantic parsing algorithms that can be employed by the question graph component 114 in constructing the one or more question graphs can include, but are not limited to: dependency parsing (e.g., to construct a question graph characterized by a dependency tree structure), consistency parsing (e.g., to construct a question graph characterized by a consistency tree), a combination thereof, and/or the like. For instance, each node in the one or more question graphs generated by the question graph component 114 can be either a root node that can represent a sentence, a branch node that can represent a phrase, or a leaf node that can represent a word. In one or more embodiments, the question graph component 114 can establish the edges of the graph as directions (e.g., without labels).

Figure 2:
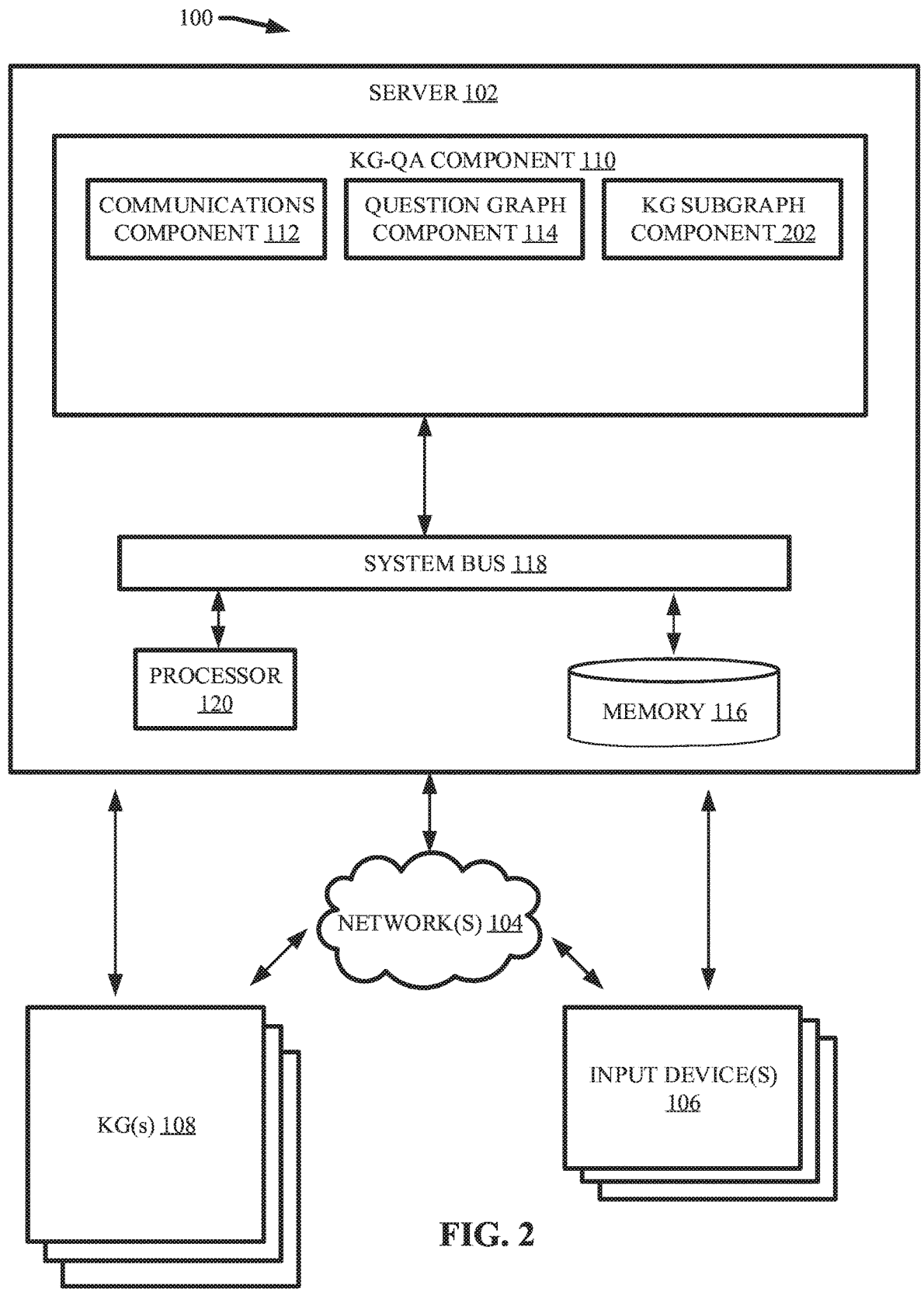
FIG. 2 illustrates a block diagram of an example, non-limiting system that can construct one or more KG subgraphs from one or more KGs to facilitate executing a KG-QA task in accordance with one or more embodiments described herein.

FIG. 2 illustrates a diagram of the example, non-limiting system 100 further comprising KG subgraph component 202 in accordance with one or more embodiments described herein. Repetitive description of like elements employed in other embodiments described herein is omitted for sake of brevity. In various embodiments, the KG subgraph component 202 can generate a plurality of KG subgraphs from the one or more KGs 108.

For example, the KG subgraphs generated by the KG subgraph component 202 can be represented as a set of semantic triples, such as resource description framework ("RDF") triples, that can be converted to one or more directed graphs with edge labels. For example, the semantic triples can define a relationship between objects of the KG subgraphs and can comprise three parts: a subject "s", a predicate "p", and an object "o". For a given semantic triple (s, p, o), the KG subgraph component 202 can assume a directed edge from subject node "s" to object node "o" with the predicate "p" as the edge label. Thereby, the predicate can define a relationship between the subject and object entities. The directed graph constructed from the semantic triples can characterize a context between the entities via the network of interconnections.

Where a knowledge base represented by the KG 108 includes entities (e.g., subjects and objects) represented by a machine-generated identifier, the KG subgraph component 202 can employ a dictionary to map each machine-generated identifier to its corresponding entity name. Further, where the knowledge base includes one or more dummy nodes that connect entities but fail to map real entities, the KG subgraph component 202 can represent the dummy nodes in the one or more KG subgraphs with one or more abstract identifiers. Further, in various embodiments the KG subgraph component 202 can derive one or more natural language questions from the one or more constructed subgraphs. In various embodiments, a question can correspond to multiple KG subgraphs (e.g., each of which can contain a potential answer to the question).

Figure 3:
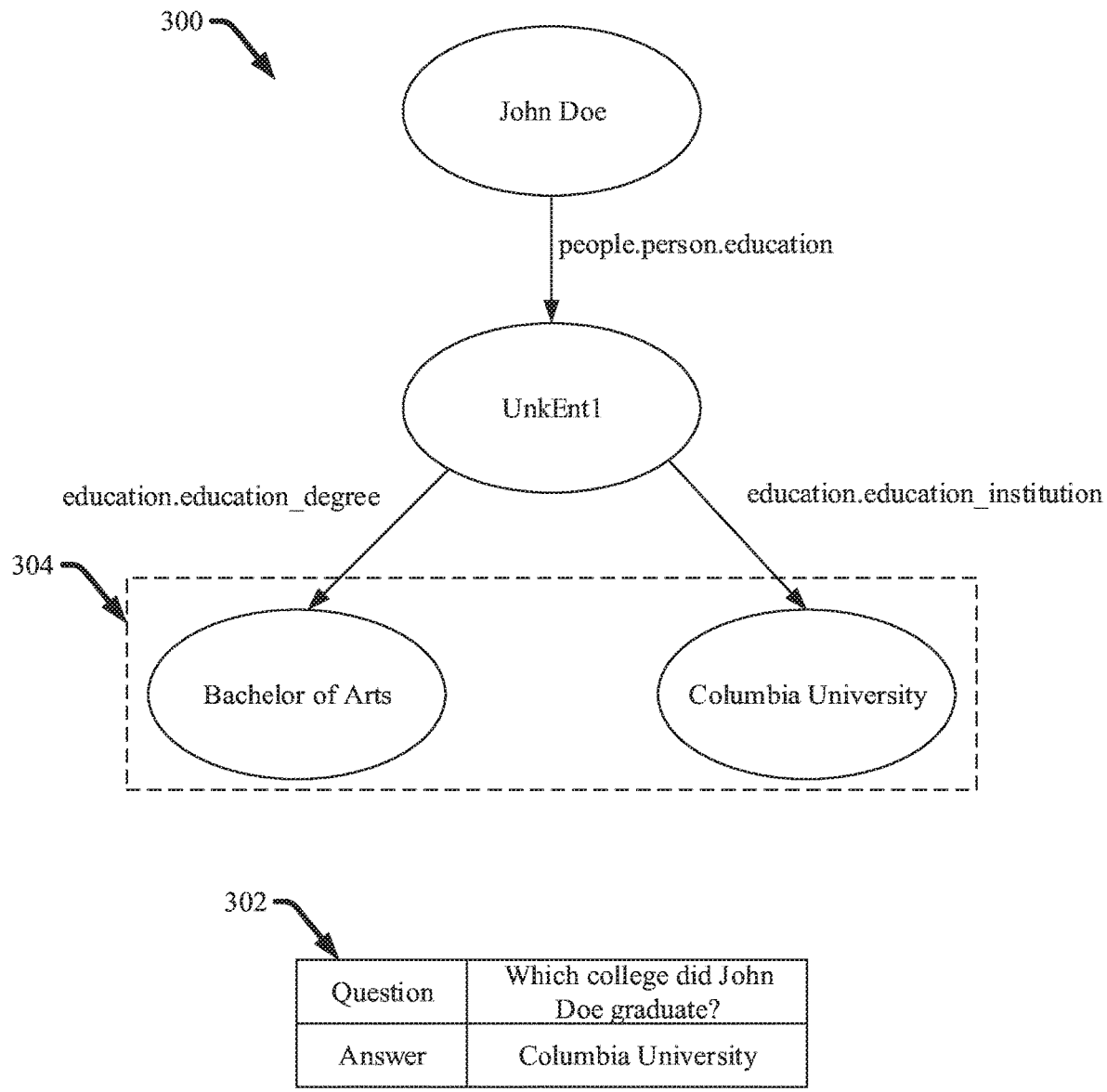
FIG. 3 illustrates a diagram of an example, non-limiting graph that can exemplify a KG subgraph construction, and can be employed to facilitate execution of a KG-QA task in accordance with one or more embodiments.

FIG. 3 illustrates a diagram of an example, non-limiting KG subgraph 300 that can be generated by the KG subgraph component 202 in accordance with one or more embodiments described herein. Repetitive description of like elements employed in other embodiments described herein is omitted for sake of brevity. Exemplary KG subgraph 300 can regard a multi-hop question answering dataset entitled "ComplexWebQuestions" ("CWQ"). As shown in FIG. 3, exemplary question 302 can be derived from the KG subgraph 300. Further, the KG subgraph 300 can include a plurality of answer paths leading to a set of answer entities 304 to the exemplary question 302. As shown in FIG. 3, the exemplary KG subgraph 300 can be constructed from one or more semantic triples that include "John Doe", "Bachelor of Arts", and "Columbia University" as subjects and/or objects and "people.person.education", "education.education_degree", and "education.education_insitution" as predicates. Within the exemplary KG subgraph 300, node 306 can be a dummy node that can be employed to connect the other entities (e.g., connect entity "John Doe" to entities "Bachelor of Arts" and "Columbia University") while not mapping to a real entity. As shown in FIG. 3, the abstract identifier "UnkEnt1" was used by the KG subgraph component 202 during construction of the exemplary KG subgraph 300 to reference the dummy node.

Figure 4:
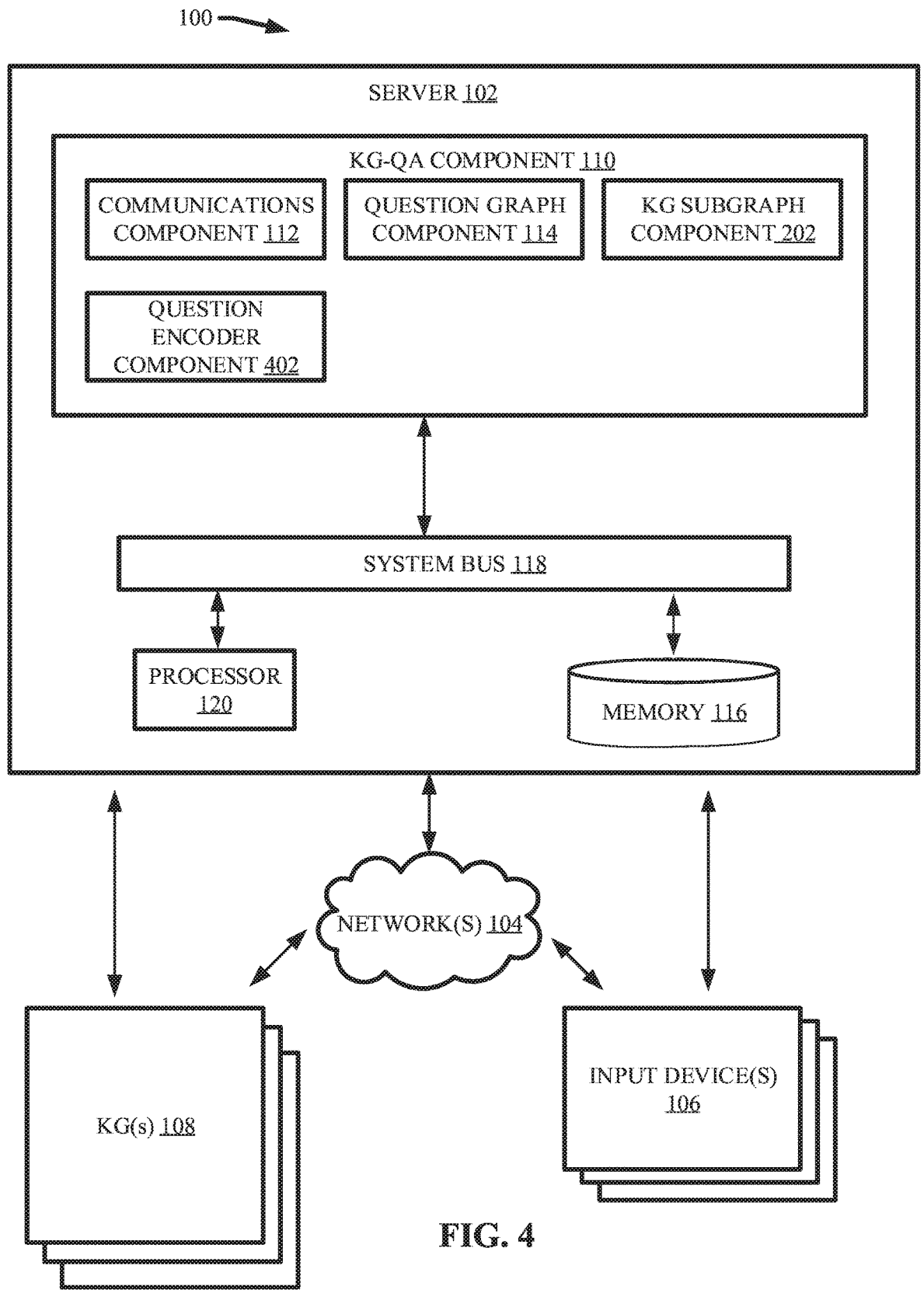
FIG. 4 illustrates a block diagram of an example, non-limiting system that encode the one or more question graphs via one or more bidirectional graph neural networks in accordance with one or more embodiments described herein.

FIG. 4 illustrates a diagram of the example, non-limiting system 100 further comprising question encoder component 402 in accordance with one or more embodiments described herein. Repetitive description of like elements employed in other embodiments described herein is omitted for sake of brevity. In various embodiments, the question encoder component 402 can employ one or more bidirectional GNN to encode structural information of the one or more question graphs generated by the question graph component 114. By translating the natural language question into the one or more question graphs, the question graph component 114 can inherently represent one or more semantic complexities of the question via the structure of the one or more question graphs. The question encoder component 402 can encode graph structure information of the one or more question graphs to leverage this semantic complexity in narrowing a semantic gap between the natural language question and the one or more KGs 108. Example graph structure information of the one or more question graphs that can be encoded by the question encoder component 402 can include, but are not limited to: neighboring nodes, edge connectivity, graph interdependencies, graph matrix, node attributes, a combination thereof, and/or the like.

For example, the question encoder component 402 can employ one or more bidirectional gated graph sequence neural networks to encode the structural information of the one or more question graphs constructed by the question graph component 114. For example, the question encoder component 402 can initialize each node of the question graph (e.g., characterized by $v \in V_Q$) with a feature vector (e.g., characterized by $x_v \in R^d$) that can be a single word embedding, where "d" can be the dimension of a vector. Thereby, the question encoder component 402 can employ the one or more bidirectional gated graph sequence neural networks to calculate the vector representation of each node "$h_{(v)}^{(l)}$" in the question graph at layer "l" in accordance with Equations 3 and 4 below.

$$h_{v\vdash}^{(l)} = GRU(\Sigma_{u \in N\vdash(v)} W_{1\vdash}^{(l-1)} h_{u\vdash}^{(l-1)}, h_{v\vdash}^{(l-1)}) \quad (3)$$

$$h_{v\dashv}^{(l)} = GRU(\Sigma_{u \in N\dashv(v)} W_{1\dashv}^{(l-1)} h_{u\dashv}^{(l-1)}, h_{v\dashv}^{(l-1)}) \quad (4)$$

Where $N_\vdash(v)$ and $N_\dashv(v)$ can denote the source-to-target and target-to-source neighbors of nodes "v" respectively. Further, $W_1^{(l-1)}$ can be a learned matric for representing updates at layer "l". By stacking layers of the given question graph, the question encoder component 402 can employ the bidirectional GNN (e.g., gated graph sequence neural network) to consider non-immediate neighbors in the one or more question graphs. Additionally, "GRU" can denote a gated recurrent unit utilized by the gated graph sequence neural network.

Additionally, forward and backward question graph node embeddings can be fed by the question encoder component 402 into one-layer perceptrons "ϕ(•)" and concatenated. In one or more embodiments, the question encoder component 402 can employ a pooling operation, such as an average pooling, to compute the neural network embedding "$r_Q$" for the question graph in accordance with Equation 5 below.

$$r_Q = \frac{1}{N_Q} \sum_{n=1}^{N_Q} concat(\phi_\vdash(h_{n\vdash}^{(L)}), \phi_\dashv(h_{n\dashv}^{(L)})) \quad (5)$$

Where "$N_Q$" can be the number of nodes in the given question graph, "L" can be the maximum number of layers of the given question graph, and "$h_n^{(L)}$" can be the final node embedding.

Figure 5:
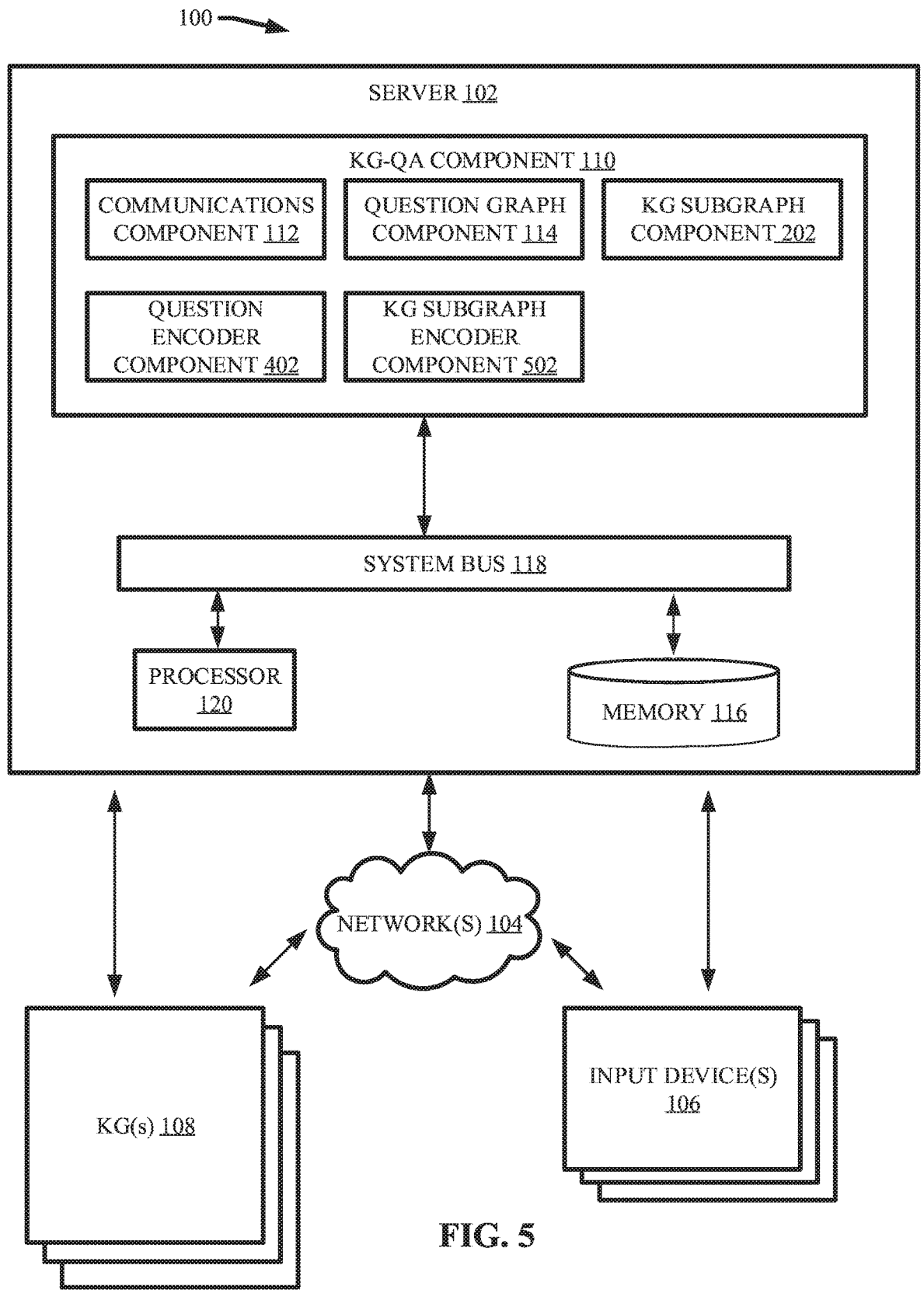
FIG. 5 illustrates a block diagram of an example, non-limiting system that encode the one or more KG subgraphs via one or more bidirectional graph neural networks in accordance with one or more embodiments described herein.

FIG. 5 illustrates a diagram of the example, non-limiting system 100 further comprising KG subgraph encoder component 502 in accordance with one or more embodiments described herein. Repetitive description of like elements employed in other embodiments described herein is omitted for sake of brevity. In various embodiments, the KG subgraph encoder component 502 can employ one or more bidirectional GNN to encode graph structure information of the one or more KG subgraphs generated by the KG subgraph component 202. The KG subgraph encoder component 502 can encode graph structure information of the one or more KG subgraphs to narrow a semantic gap between the natural language question and the one or more KGs 108. Example graph structure information of the one or more KG subgraphs that can be encoded by the KG subgraph encoder component 502 can include, but are not limited to: neighboring nodes, edge connectivity, graph interdependencies, graph matrix, node attributes, a combination thereof, and/or the like.

For example, the KG subgraph encoder component 502 can employ one or more bidirectional message passing neural networks ("MPNNs") to encode both the nodes and edges of the one or more KG subgraphs. In various embodiments, each node (e.g., characterized by $v \in V_i$) and/or edge (e.g., characterized by $(u, v) \in E_i$) of the one or more KG subgraphs can include multiple words (e.g., such as exemplified in KG subgraph 300). Therefore, the KG subgraph encoder component 502 can utilize the average of word embeddings to initialize the node feature "$x_v$" and/or the edge feature vector "$e_{u,v}$". For instance, each node representation "$s_v$" in a given KG subgraph "$g_i$" can be updated in accordance with Equations 6 and 7 below.

$$s'_{v\vdash} = W_{2\vdash} s_{v\vdash} + \Sigma_{u \in N_\vdash(v)} s_u \cdot \rho_\vdash(e_{u,v}) \quad (6)$$

$$s'_{v\dashv} = W_{2\dashv} s_{v\dashv} + \Sigma_{u \in N_\dashv(v)} s_u \cdot \rho_\dashv(e_{u,v}) \quad (7)$$

Where "$W_{2\vdash}$" and "$W_{2\dashv}$" can be learnable parameters. Similarly, "$N_\vdash(v)$" and "$N_\dashv(v)$" can be nodes in the given KG subgraph that neighbor node "v". Further, $(u, v) \in E_i$ can be a directed edge of the given KG subgraph. Additionally, ρ(•) can be a single-layer perceptron with rectified linear unit ("ReLU") activation function. The neural network embedding "$r_i$" for a given KG subgraph "$g_i$" can be computed by the KG subgraph encoder component 502 in accordance with Equation 8 below.

$$r_i = \frac{1}{N_i} \sum_{n=1}^{N_i} concat(\varphi_\vdash(s'_{n\vdash}), \varphi_\dashv(s'_{n\dashv})) \quad (8)$$

Where "φ(•)" can be a single-layer perceptron, "$N_i$" can be the number nodes of the given KG subgraph, and "$s'_n$" can be the final node embedding of the node "n".

Figure 6:
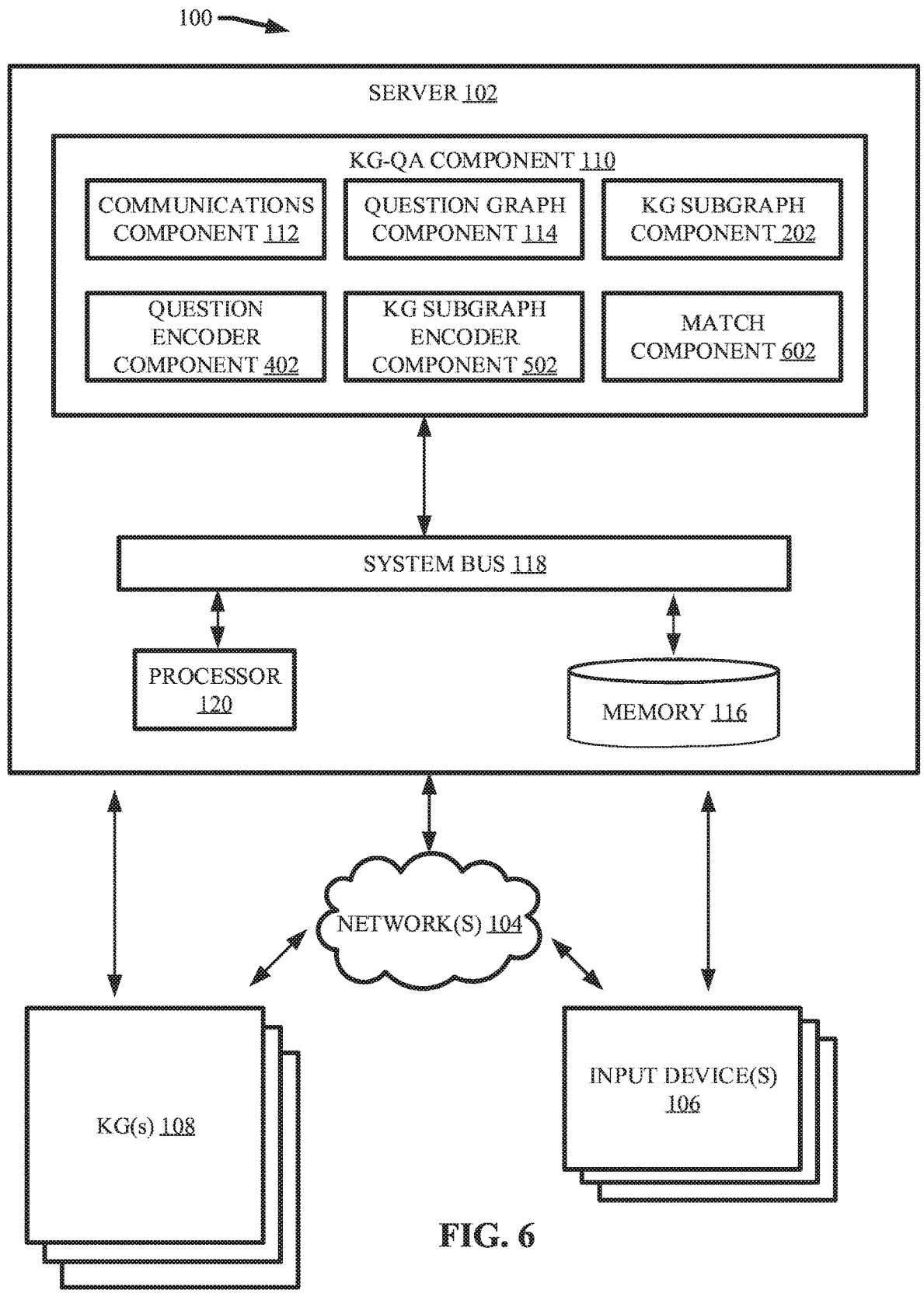
FIG. 6 illustrates a block diagram of an example, non-limiting system that can match-then-rank one or more embeddings of the one or more question graphs and/or KG subgraphs in accordance with one or more embodiments described herein.

FIG. 6 illustrates a block diagram of the example, non-limiting system 100 further comprising match component 602 in accordance with one or more embodiments described herein. Repetitive description of like elements employed in other embodiments described herein is omitted for sake of brevity. In various embodiments, the match component 602 can compare the neural network embeddings of the question graph (e.g., generated by the question encoder component 402) with the neural network embeddings of the KG subgraphs (e.g., generated by the KG subgraph encoder component 502).

For example, the match component 602 can calculate a matching score between the question graph embedding "$r_Q$" and the KG subgraph embedding "$r_i$". For instance, each KG subgraph can be characterized by one or more respective KG subgraph embeddings, and each KG subgraph embedding can be compared with the question graph embedding; thereby, the match component 602 can generate match scores associated with each KG subgraph. The match scores can characterize an amount of similarity between the respective KG subgraph and the question graph. In various embodiments, the match component 602 can execute a similarity algorithm to computer the match scores. For example, the match component 602 can execute a cosine similarity algorithm to compare the neural network embeddings in accordance with Equation 9 below.

$$\hat{t} = \cos(r_Q, r_i) \quad (9)$$

Further, the match component 602 can compute a loss function, such as the mean square error ("MSE") in accordance with Equation 10 below.

$$L = \frac{1}{N_m} \sum_{m=1}^{N_m} (t_m - \hat{t_m})^2 \quad (10)$$

Where "$N_m$" can be the number of samples and "$t_m$" can be the true label.

The match component 602 can determine that a given KG subgraph embedding matches the question graph embedding based on the associate match score being greater than or equal to a defined threshold (e.g., defined via the one or more input devices 106). Further, the match component 602 can rank the KG subgraphs associated with the matched KG subgraph embeddings based on the match score. For example, amongst the KG subgraph embeddings determined by the match component 602 to match the question graph embedding, the match component 602 can rank the KG subgraph embeddings based on their match score. For instance, as the match score increases, an amount of similarity between the associate KG subgraph and question graph can also increase.

Thus, in various embodiments, the KG-QA component 110 (e.g., via question graph component 114 and/or KG subgraph component 202) can construct a question graph, which can be a directed graph characterizing a natural language question presented via the one or more input devices 106, and one or more KG subgraphs, which can be one or more directed graphs characterizing one or more subsets of one or more KGs 108 that can be employed to answer the natural language question. Further, the KG-QA component 110 (e.g., via question encoder component 402 and/or KG subgraph encoder component 502) can encode the graph structure information of the question graph and one or more KG subgraphs using one or more bidirectional GNNs to generate one or more neural network embeddings (e.g., question graph embeddings and/or KG subgraph embeddings). Additionally, the KG-QA component 110 (e.g., via match component 602) can compute an amount of similarity between the question graph embedding and each of the KG subgraph embeddings (e.g., by executing one or more similarity algorithms, such as a cosine similarity algorithm). For example, the amount of similarity associated with each comparison can be characterized by respective match scores. By comparing the match scores to a defined threshold, the KG-QA component 110 (e.g., via match component 602) can determine whether a given KG subgraph matches the question graph. At least because the question embeddings and KG subgraph embeddings are utilized to compute the match score, the structural information of the question graph and the KG subgraphs can be incorporated into the matching determination. Moreover, the KG-QA component 110 can utilize the match scores to rank the KG subgraphs according to their similarity to the question graph. Thereby, the KG-QA component 110 can identify those KG subgraphs of the one or more KGs 108 that most closely match the question graph and thereby have the highest expectation of answering the natural language question correctly.

Figure 7:
FIG. 7 illustrates a diagram of an example, non-limiting table depicting ranking results on multiple test datasets to demonstrate the efficacy of one or more KG-QA tasks in accordance with one or more embodiments described herein.
Figure 9:
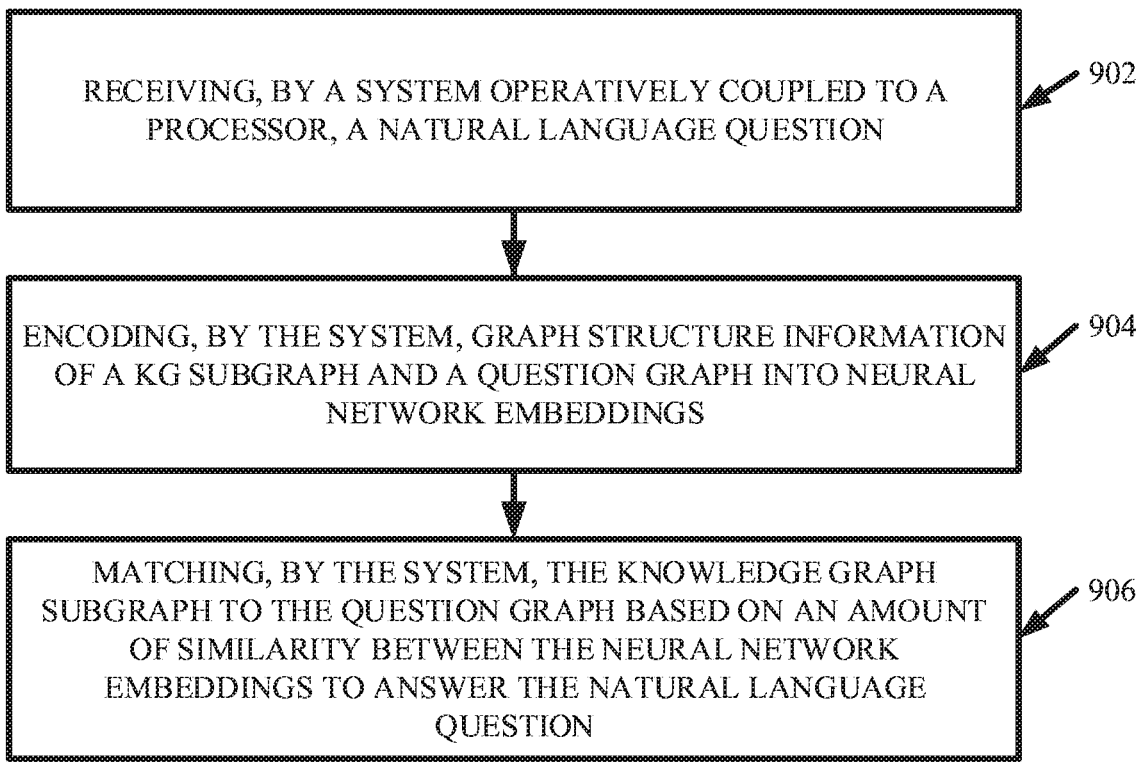
FIG. 9 illustrates a flow diagram of an example, non-limiting computer-implemented method that can be employed to facilitate execution of one or more KG-QA tasks in accordance with one or more embodiments described herein.

FIGS. 7-9 illustrate diagrams of example, non-limiting tables that can demonstrate the efficacy of the system 100 in accordance with one or more embodiments described herein. Repetitive description of like elements employed in other embodiments described herein is omitted for sake of brevity. For example, the efficacy of the various embodiments of the KG-QA component 110 described herein can be demonstrated with regards to two publicly available datasets: ComplexWebQuestion ("CWQ") and PathQuestion ("PQ"). The CWQ dataset was formed by using an original SPARQL (a recursive acronym for SPARQL Protocol and RDF Query Language) query as inputs and returning subgraphs rather than answer entities. The PQ dataset can consist of answer paths "r" from a topic entity "e" to its answer "a", where each answer path can be a sequence of entities and relations in a KG 108, such as $$e_s \xrightarrow{r_1} e_1 \xrightarrow{r_2} e_2 \ldots \xrightarrow{r_n} a.$$

The CWQ dataset contains 22,912 matched ⟨question, subgraph⟩ pairs and the PQ dataset contains 11,793 pairs. For a matching machine learning task, the same number of negative samples as positive samples were produced by randomly choosing an unmatched subgraph for a question. In addition to the intrinsic evaluation for the subgraph matching machine learning task, the KG-QA component 110 was employed for the KG subgraph ranking machine learning task extrinsically. The set of candidate KG subgraphs can be composed of a true subgraph and 49 randomly selected subgraphs from the testing set.

To achieve the results presented in FIGS. 7-9, the CWQ and PQ datasets were analyzed with the following baseline models: a first model ("B-B") in which bidirectional long short-term memory ("BLSTM") neural networks were employed to encode input question sequences and RDF triples sequences, and the hidden state was 200-dimension; a second model ("C-C") in which 1 dimensional CNNs are employed over the question and RDF triples sequences, and both CNN encoders consisted of 4 convolution layers and a dense layer; a third model ("B-M") in which the question is encoded by a BLSTM and the KG subgraph is encoded by a MPNN; and a matching model employed by the KG-QA component 110 in accordance with various embodiments described herein ("G-M"), where the question graph was encoded (e.g., via question encoder component 402) using a gated graph sequence neural network and the KG subgraph was encoded (e.g., via KG subgraph encoder component 502) using a MPNN, the gated graph sequence neural networks was stacked to 3-layer, and the output dimensions of the gated graph sequence neural network and MPNN were both 300 dimensions.

To achieve the results depicted in FIGS. 7-9, the KG-QA component 110 can employ two vocabulary lists for each encoder and implement the various features described herein using PyTorch geometric. Further, the KG-QA component 110 can employ the Adam optimization method with an initial learning rate of 0.0005 and the learnable parameters can be updated every 64 instances. Additionally, the word embeddings can be of 300-dimension.

Recall@K (K=1, 5) and mean reciprocal rank ("MRR") can be used to evaluate the KG subgraph ranking task. Table 700 of FIG. 7 shows ranking results from the baseline models on both the CWQ and PQ datasets. Compared with the B-B model and the C-C model, the G-M model employed by KG-QA component 110 in accordance with various embodiments described herein can improve the MRR and Recall@ 1 significantly on both datasets. The improved performance can be attributed, for example, to at least the attention to graph structure information analyzed by the KG-QA component 110.

Further, accuracy ("Acc"), precision ("P"), recall ("R") and F1 values can be adopted to evaluate the graph matching task. Table 800 of FIG. 8 shows matching results from the baseline models on both the CWQ and PQ datasets. As shown in table 800, the G-M model employed by the KG-QA component 110 in accordance with various embodiments described herein can perform better than the other baseline models on all matching metrics on the CWQ dataset. Thereby, the G-M model employed by the KG-QA component 110 in accordance with various embodiments can be better at capturing the semantic complexity of the graphs as compared to the other baseline models.

FIG. 9 illustrates a flow diagram of an example, non-limiting computer-implemented method 900 that can be implemented by the KG-QA component 110 to execute one or more KG-QA tasks in accordance with one or more embodiments described herein. Repetitive description of like elements employed in other embodiments described herein is omitted for sake of brevity.

At 902, the computer-implemented method 900 can comprise receiving (e.g., via communication component 112), by a system 100 operatively coupled to a processor 120, one or more natural language questions. For example, one or more input devices 106 can be employed to enter the one or more natural language questions into the system 100. In various embodiments, the computer-implemented method 900 can be employed to derive one or more answers to the one or more natural language questions.

At 904, the computer-implemented method 900 can comprise encoding (e.g., via question encoder component 402 and/or KG subgraph encoder component 502), by the system 100, graph structure information of one or more KG subgraphs and a question graph into neural network embeddings. For example, one or more question graphs can be constructed (e.g., via question graph component 114) from the one or more natural language questions. In various embodiments, the one or more question graphs can be directed graphs with edges having directions but not labels. For example, the one or more question graphs can be constructed (e.g., via question graph component 114) using one or more parsing techniques, such as constituency parsing.

Additionally, the one or more KG subgraphs can be constructed (e.g., via KG subgraph component 202) from one or more KGs 108. In various embodiments, the one or more KG subgraphs can be directed graphs constructed from a set of semantic triples comprised within the one or more KGs 108. For example, the nodes of the one or more KG subgraphs can be derived from the subject and/or object entities of the semantic triples, where the edges can be labelled based on the predicate of the semantic triples. For instance, KG subgraph 300 exemplifies the structure that can be employed to construct the one or more KG subgraphs.

In accordance with various embodiments, the computer-implemented method 900 can employ bidirectional GNNs, such as a gated graph sequence neural network, to encode structural features of the question graph into one or more neural network embeddings. Further, in accordance with various embodiments, the computer-implemented method 900 can employ a bidirectional GNN, such as a MPNN, to encode structural features of the one or more KG subgraphs into one or more neural network embeddings. Example structural features of the question graph and/or KG subgraphs that can be encoded can include, but are not limited to: node proximity, node relations to each other, graph interdependencies, graph matrix, node attributes, a combination thereof, and/or the like.

At 906, the computer-implemented method 900 can comprise matching (e.g., via match component 602), by the system 100, one or more of the KG subgraphs to the question graph based on an amount of similarity between the neural network embeddings to answer the one or more natural language questions. For example, the computer-implemented method 900 can employ one or more cosine similarity and/or MSE algorithms to compute one or more similarity scores in accordance with at least Equations 9-10.

Figure 10:
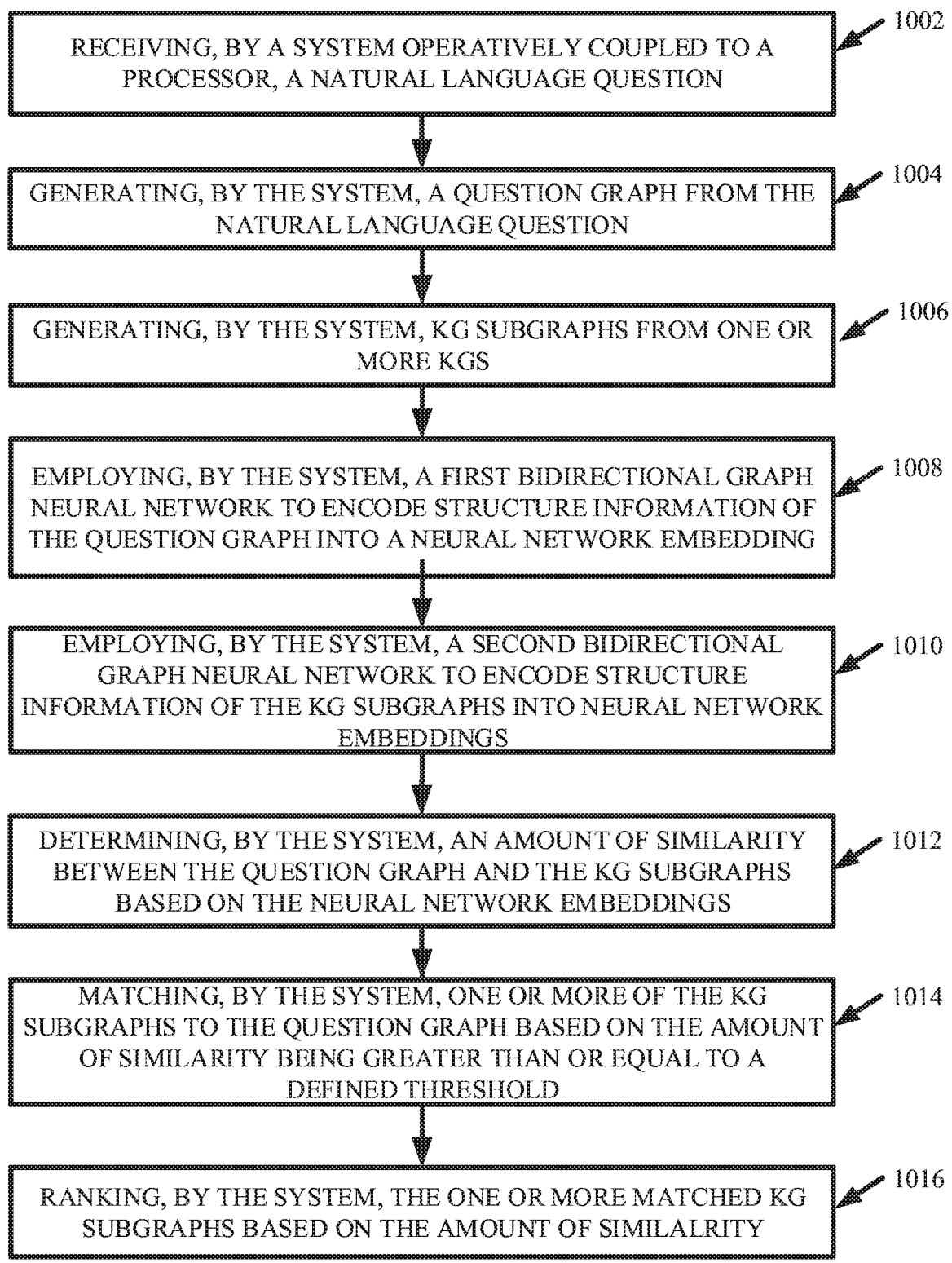
FIG. 10 illustrates a flow diagram of an example, non-limiting computer-implemented method that can be employed to facilitate execution of one or more KG-QA tasks in accordance with one or more embodiments described herein.

FIG. 10 illustrates a flow diagram of an example, non-limiting computer-implemented method 1000 that can be implemented by the KG-QA component 110 to execute one or more KG-QA tasks in accordance with one or more embodiments described herein. Repetitive description of like elements employed in other embodiments described herein is omitted for sake of brevity.

At 1002, the computer-implemented method 1000 can comprise receiving (e.g., via communication component 112), by a system 100 operatively coupled to a processor 120, one or more natural language questions. For example, one or more input devices 106 can be employed to enter the one or more natural language questions into the system 100. In various embodiments, the computer-implemented method 1000 can be employed to derive one or more answers to the one or more natural language questions.

At 1004, the computer-implemented method 1000 can comprise generating (e.g., via question graph component 114), by the system 100, one or more question graphs from the one or more natural language questions. For example, one or more question graphs can be constructed (e.g., via question graph component 114) from the one or more natural language questions. In various embodiments, the one or more question graphs can be directed graphs with edges having directions but not labels. For example, the one or more question graphs can be constructed (e.g., via question graph component 114) using one or more parsing techniques, such as constituency parsing.

At 1006, the computer-implemented method 1000 can comprise generating (e.g., via KG subgraph component 202), by the system 100, one or more KG subgraphs from one or more KGs 108. For example, the one or more KG subgraphs can be directed graphs constructed from a set of semantic triples (e.g., RDF triples) comprised within the one or more KGs 108. For example, the nodes of the one or more KG subgraphs can be derived from the subject and/or object entities of the semantic triples, where the edges can be labelled based on the predicate of the semantic triples. For instance, KG subgraph 300 exemplifies the structure that can be employed to construct the one or more KG subgraphs.

At 1008, the computer-implemented method 1000 can comprise encoding (e.g., via question encoder component 402), by the system 100, graph structure information of the question graph into one or more neural network question embeddings (e.g., question graph embedding "$r_Q$". For example, a first bidirectional GNN, such as a gated graph sequence neural network, can be employed to encode one or more structural features of the question graph into one or more neural network embeddings. Example structural features of the question graph and/or KG subgraphs that can be encoded can include, but are not limited to: node proximity, node relations to each other, graph interdependencies, graph matrix, node attributes, a combination thereof, and/or the like. For instance, the encoding at 1006 can be performed in accordance with Equations 3-5 described herein.

At 1010, the computer-implemented method 1000 can comprise encoding (e.g., via KG subgraph encoder component 502), by the system 100, graph structure information of the one or more KG subgraphs into neural network embeddings (e.g., KG subgraph embeddings "$r_i$"). For example, a second bidirectional GNN, such as a MPNN, can be employed to encode structural features of the one or more KG subgraphs into one or more neural network embeddings. Example structural features of the question graph and/or KG subgraphs that can be encoded can include, but are not limited to: node proximity, node relations to each other, graph interdependencies, graph matrix, node attributes, a combination thereof, and/or the like. For instance, the encoding at 1006 can be performed in accordance with Equations 6-8 described herein.

At 1012, the computer-implemented method 1000 can comprise determining (e.g., via match component 602), by the system 100, an amount of similarity between the question graph and the one or more KG subgraphs based on the neural network embeddings. For example, one or more similarity algorithms, such as a cosine similarity algorithm, and/or loss algorithms, such as MSE, can be employed to compute matching score values that can characterize the amount of similarity between the question graph embedding and respective KG subgraph embeddings. For instance, the matching score values can be computed in accordance with Equations 9-10 described herein.

At 1014, the computer-implemented method 1000 can comprise matching (e.g., via match component 602), by the system 100, one or more of the KG subgraphs to the question graph based on the amount of similarity determined at 1012. For example, a KG subgraph can be determined to be matching the question graph where the matching score value associated with a comparison of the KG subgraph's neural network embedding to the question graph's neural network embedding is greater than or equal to a defined threshold. For instance, a matching score value greater than or equal to the defined threshold can be indicative that the KG subgraph and the question graph share enough similarities to constitute a matching determination.

At 1016, the computer-implemented method 1000 can comprise ranking (e.g., via match component 602), by the system 100, the one or more matched KG subgraphs based on the amount of similarity determined at 1012. For example, the KG subgraphs matched at 1014 (e.g., the KG subgraphs associated with matching score values greater than or equal to the defined threshold) can be ranked based on the associate matching score values. For instance, the matched KG subgraphs can be ranked from highest matching score value to lowest matching score value. The KG subgraph associated with the highest matching score value can be identified as the KG subgraph most similar to the question graph and thereby most suitable for answering the natural language question.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
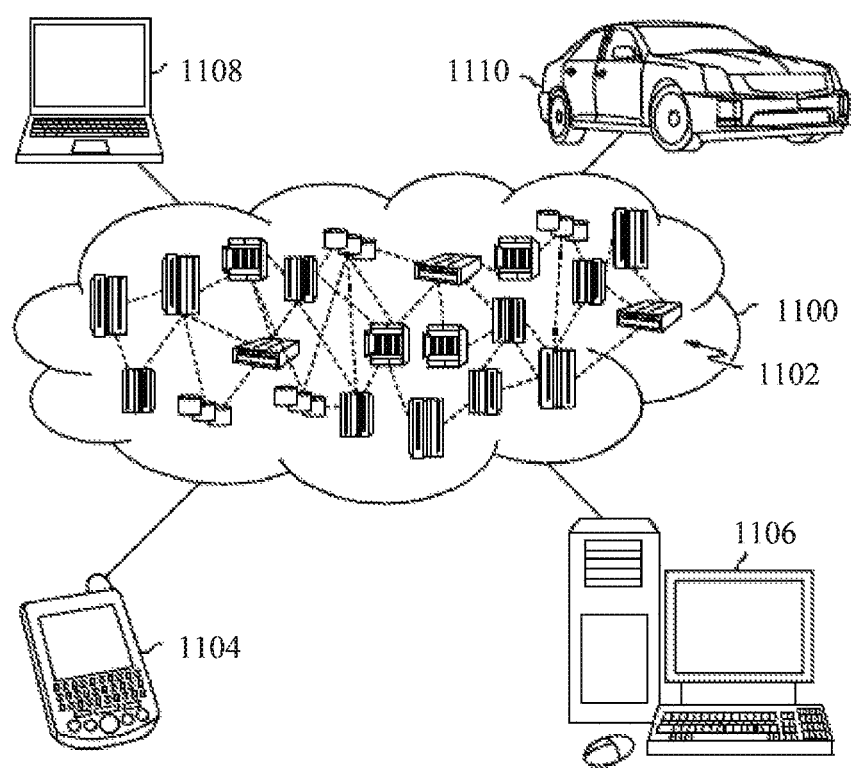
FIG. 11 depicts a cloud computing environment in accordance with one or more embodiments described herein.

Referring now to FIG. 11, illustrative cloud computing environment 1100 is depicted. As shown, cloud computing environment 1100 includes one or more cloud computing nodes 1102 with which local computing devices used by cloud consumers, such as, for example, personal digital assistant (PDA) or cellular telephone 1104, desktop computer 1106, laptop computer 1108, and/or automobile computer system 1110 may communicate. Nodes 1102 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1104-1110 shown in FIG. 11 are intended to be illustrative only and that computing nodes 1102 and cloud computing environment 1100 can communicate with any type of computerized device over any type of network and/or network addressable connection (e.g., using a web browser).

Figure 12:
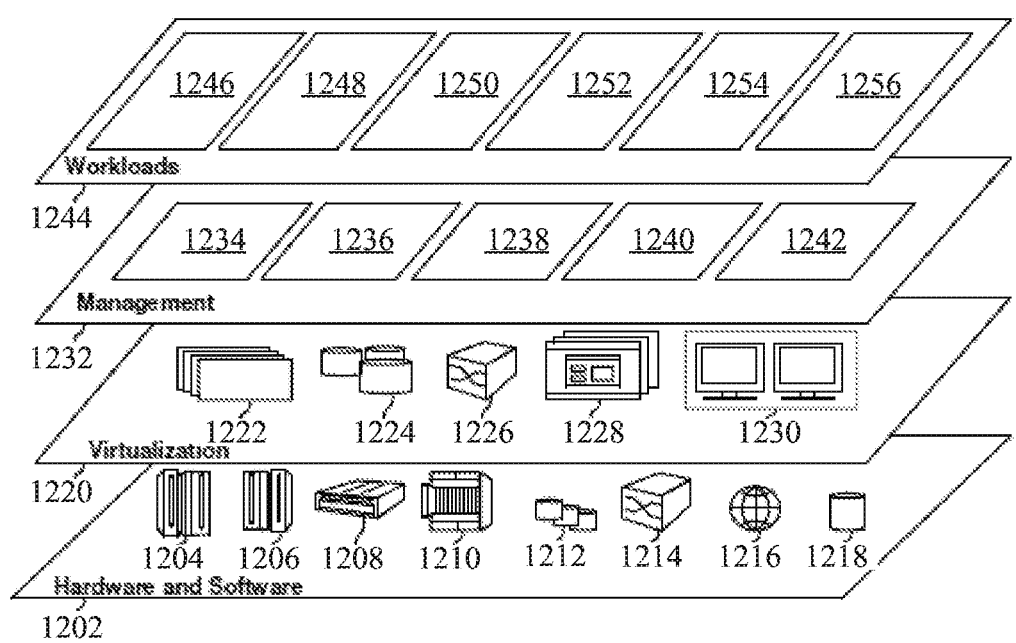
FIG. 12 depicts abstraction model layers in accordance with one or more embodiments described herein.

Referring now to FIG. 12, a set of functional abstraction layers provided by cloud computing environment 1100 (FIG. 11) is shown. Repetitive description of like elements employed in other embodiments described herein is omitted for sake of brevity. It should be understood in advance that the components, layers, and functions shown in FIG. 12 are intended to be illustrative only and embodiments of the invention are not limited thereto. As depicted, the following layers and corresponding functions are provided.

Hardware and software layer 1202 includes hardware and software components. Examples of hardware components include: mainframes 1204; RISC (Reduced Instruction Set Computer) architecture based servers 1206; servers 1208; blade servers 1210; storage devices 1212; and networks and networking components 1214. In some embodiments, software components include network application server software 1216 and database software 1218.

Virtualization layer 1220 provides an abstraction layer from which the following examples of virtual entities may be provided: virtual servers 1222; virtual storage 1224; virtual networks 1226, including virtual private networks; virtual applications and operating systems 1228; and virtual clients 1230.

In one example, management layer 1232 may provide the functions described below. Resource provisioning 1234 provides dynamic procurement of computing resources and other resources that are utilized to perform tasks within the cloud computing environment. Metering and Pricing 1236 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1238 provides access to the cloud computing environment for consumers and system administrators. Service level management 1240 provides cloud computing resource allocation and management such that required service levels are met. Service Level Agreement (SLA) planning and fulfillment 1242 provide pre-arrangement for, and procurement of, cloud computing resources for which a future requirement is anticipated in accordance with an SLA.

Workloads layer 1244 provides examples of functionality for which the cloud computing environment may be utilized. Examples of workloads and functions which may be provided from this layer include: mapping and navigation 1246; software development and lifecycle management 1248; virtual classroom education delivery 1250; data analytics processing 1252; transaction processing 1254; and KG-QA processing 1256. Various embodiments of the present invention can utilize the cloud computing environment described with reference to FIGS. 11 and 12 to perform the various features of the KG-QA component 110 and/or share data between the server 102, input devices 106, and/or KGs 108.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 13:
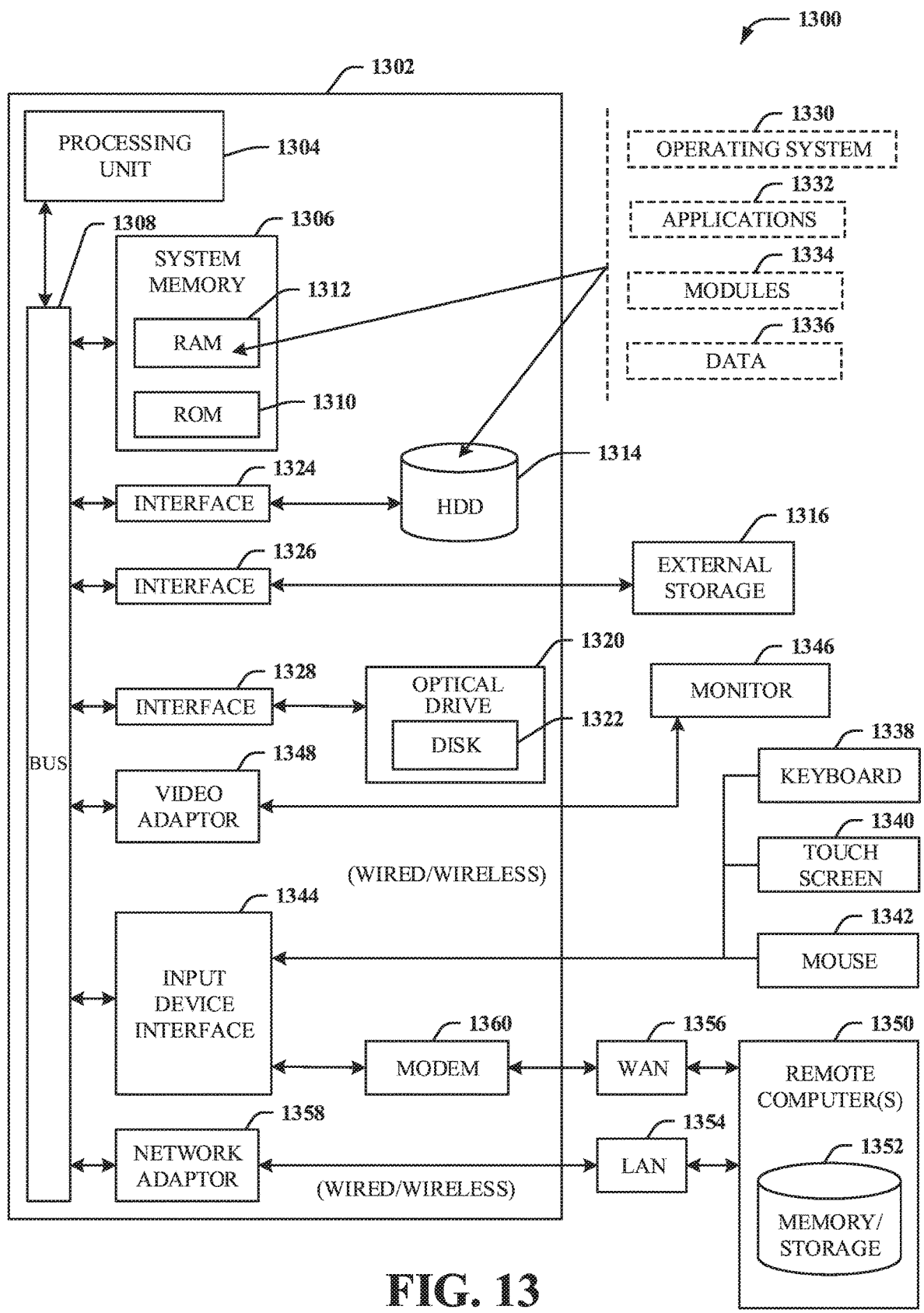
FIG. 13 illustrates a block diagram of an example, non-limiting operating environment in which one or more embodiments described herein can be facilitated.

In order to provide additional context for various embodiments described herein, FIG. 13 and the following discussion are intended to provide a general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system ("BIOS") can be stored in a non-volatile memory such as ROM, erasable programmable read only memory ("EPROM"), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive ("HDD") 1314 (e.g., EIDE, SATA), one or more external storage devices 1316 (e.g., a magnetic floppy disk drive ("FDD") 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive ("SSD") could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus ("USB") and Institute of Electrical and Electronics Engineers ("IEEE") 1294 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine ("VM") of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1302, e.g., applied at the application execution level or at the operating system ("OS") kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1294 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network ("LAN") 1354 and/or larger networks, e.g., a wide area network ("WAN") 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point ("AP") disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:

a question answering over knowledge graph component that:
 trains a bidirectional gated graph sequence neural network to encode first neural network embeddings of graph structure information of knowledge graph subgraphs;
 trains a bidirectional message passing neural network to encode second neural network embeddings of graph structure information of question graphs;
 encodes first graph structure information of a knowledge graph subgraph of a knowledge graph into a first neural network embedding using the bidirectional gated graph sequence neural network, wherein the encoding the first graph structure information comprises generating, for a node of the knowledge graph subgraph:
  a node vector representation for the node of the knowledge graph subgraph based on node vector representations for one or more neighboring nodes of the knowledge graph subgraph to the node in the knowledge graph subgraph, and edge representations for one or more edges between the node of the knowledge graph subgraph and the one or more neighboring nodes of the knowledge graph subgraph; and
 encodes second graph structure information of a question graph into a second neural network embedding using the bidirectional message passing neural network, wherein the encoding the second graph structure information comprises generating, for a node of the question graph:
  a vector representation for the node of the question graph at a layer of the question graph based on vector representations for one or more neighboring nodes of the question graph to the node of the question graph at another layer of the question graph; and
 a match component that executes a similarity algorithm to compute a matching score from the first neural network embedding and the second neural network embedding, wherein the matching score characterizes an amount of similarity between the question graph and the knowledge graph subgraph.

2. The system of claim 1, wherein the computer executable components further comprise:
 a question graph component that constructs the question graph from a natural language question using a semantic parsing algorithm; and
 a knowledge graph subgraph component that constructs the knowledge graph subgraph from one or more semantic triples included in the knowledge graph, wherein the question graph and the knowledge graph subgraph are directed graphs.

3. The system of claim 2, wherein the semantic parsing algorithm is a constituency parsing algorithm.

4. The system of claim 1, wherein the similarity algorithm is a cosine similarity algorithm.

5. The system of claim 1, wherein the match component further ranks the knowledge graph subgraph amongst a plurality of knowledge graph subgraphs of one or more knowledge graphs based on the matching score, and wherein the one or more knowledge graphs comprise the knowledge graph, and the plurality of knowledge graph subgraphs are constructed from the one or more knowledge graphs.

6. A computer-implemented method, comprising:
 training, by a system operatively coupled to a processor, a bidirectional gated graph sequence neural network to encode first neural network embeddings of graph structure information of knowledge graph subgraphs;
 training, by the system, a bidirectional message passing neural network to encode second neural network embeddings of graph structure information of question graphs;
 encoding, by the system, first graph structure information of a knowledge graph subgraph of a knowledge graph into a first neural network embedding using the bidirectional gated graph sequence neural network, wherein the encoding the first graph structure information comprises generating, for a node of the knowledge graph subgraph:
  a node vector representation for the node of the knowledge graph subgraph based on node vector representations for one or more neighboring nodes of the knowledge graph subgraph to the node in the knowledge graph subgraph, and edge representations for one or more edges between the node of the knowledge graph subgraph and the one or more neighboring nodes of the knowledge graph subgraph;
 encoding, by the system, second graph structure information of a question graph into a second neural network embedding using the bidirectional message passing neural network, wherein the encoding the second graph structure information comprises generating, for a node of the question graph:
  a vector representation for the node of the question graph at a layer of the question graph based on vector representations for one or more neighboring nodes of the question graph to the node of the question graph at another layer of the question graph; and
 determining, by the system, an amount of similarity between the question graph and the knowledge graph subgraph based on the first neural network embedding and the second neural network embedding.

7. The computer-implemented method of claim 6, further comprising:
 generating, by the system, the question graph from a natural language question using a semantic parsing algorithm; and
 generating, by the system, the knowledge graph subgraph from one or more semantic triples included in a knowledge graph, wherein the question graph and the knowledge graph subgraph are directed graphs.

8. The computer-implemented method of claim 6, wherein the amount of similarity is further based on a cosine similarity determination.

9. The computer-implemented method of claim 8, further comprising:
 matching, by the system, the knowledge graph subgraph to the question graph based on the amount of similarity being greater than or equal to a defined threshold.

10. The computer-implemented method of claim 6, further comprising:
 ranking, by the system, the knowledge graph subgraph amongst a plurality of knowledge graph subgraphs of one or more knowledge graphs based on the amount of similarity and respective amounts of similarities of the plurality of knowledge graph subgraphs and the question graph, wherein the one or more knowledge graphs comprise the knowledge graph, and the plurality of knowledge graph subgraphs are constructed from the one or more knowledge graphs.

11. A computer program product for identifying candidate knowledge graph subgraphs in a question answering over knowledge graph task, the computer program product comprising a computer readable storage medium having program instructions embodied therewith, the program instructions executable by a processor to cause the processor to:
- train, by the processor, a bidirectional gated graph sequence neural network to encode first neural network embeddings of graph structure information of knowledge graph subgraphs;
- train, by the processor, a bidirectional message passing neural network to encode second neural network embeddings of graph structure information of question graphs;
- encode, by the processor, first graph structure information of a knowledge graph subgraph of a knowledge graph into a first neural network embedding using the bidirectional gated graph sequence neural network, wherein the encoding the first graph structure information comprises generating, for a node of the knowledge graph subgraph:
  - a node vector representation for the node of the knowledge graph subgraph based on node vector representations for one or more neighboring nodes of the knowledge graph subgraph to the node in the knowledge graph subgraph, and edge representations for one or more edges between the node of the knowledge graph subgraph and the one or more neighboring nodes of the knowledge graph subgraph;
- encode, by the processor, second graph structure information of a question graph into a second neural network embedding using the bidirectional message passing neural network, wherein the encoding the second graph structure information comprises generating, for a node of the question graph:
  - a vector representation for the node of the question graph at a layer of the question graph based on vector representations for one or more neighboring nodes of the question graph to the node of the question graph at another layer of the question graph; and
- determine, by the processor, an amount of similarity between the question graph and the knowledge graph subgraph based on the first neural network embedding and the second neural network embedding.

12. The computer program product of claim 11, wherein the program instructions further cause the processor to:
- generate, by the processor, the question graph from a natural language question using a semantic parsing algorithm; and
- generate, by the processor, the knowledge graph subgraph from one or more semantic triples included in a knowledge graph, wherein the question graph and the knowledge graph subgraph are directed graphs.

13. The computer program product of claim 11, wherein the amount of similarity is further based on a cosine similarity determination.

14. The computer program product of claim 11, wherein the program instructions further cause the processor to:
- match, by the processor, the knowledge graph subgraph to the question graph based on the amount of similarity being greater than or equal to a defined threshold.

15. The computer program product of claim 11, wherein the program instructions further cause the processor to:
- rank, by the processor, the knowledge graph subgraph amongst a plurality of knowledge graph subgraphs of one or more knowledge graphs based on the amount of similarity and respective amounts of similarities of the plurality of knowledge graph subgraphs and the question graph, wherein the one or more knowledge graphs comprise the knowledge graph, and the plurality of knowledge graph subgraphs are constructed from the one or more knowledge graphs.

16. The computer program product of claim 11, wherein the amount of similarity is further based on a mean square error determination.

17. The computer program product of claim 12, wherein the semantic parsing algorithm is a constituency parsing algorithm.

18. The system of claim 1, wherein the similarity algorithm comprises on a mean square error determination.

19. The computer-implemented method of claim 6, wherein the amount of similarity is further based on a mean square error determination.

20. The computer-implemented method of claim 7, wherein the semantic parsing algorithm is a constituency parsing algorithm.

* * * * *